(12) United States Patent
Altemark

(10) Patent No.: US 7,550,862 B2
(45) Date of Patent: Jun. 23, 2009

(54) WIND TURBINE AND METHOD FOR THE AUTOMATIC CORRECTION OF WIND VANE SETTINGS

(75) Inventor: Jens Altemark, Rendsburg (DE)

(73) Assignee: REpower Systems AG, Hamburg (DE)

( * ) Notice: Subject to any disclaimer, the term of this patent is extended or adjusted under 35 U.S.C. 154(b) by 237 days.

(21) Appl. No.: 11/666,214

(22) PCT Filed: Oct. 21, 2005

(86) PCT No.: PCT/EP2005/011352

§ 371 (c)(1),
(2), (4) Date: Apr. 25, 2007

(87) PCT Pub. No.: WO2006/045556

PCT Pub. Date: May 4, 2006

(65) Prior Publication Data

US 2008/0111379 A1    May 15, 2008

(30) Foreign Application Priority Data

Oct. 25, 2004   (DE) ...................... 10 2004 051 843

(51) Int. Cl.
*F03D 7/00* (2006.01)
(52) U.S. Cl. .............................. 290/44; 290/55; 416/17
(58) Field of Classification Search .................. 290/43, 290/44, 54, 55; 416/17, 35
See application file for complete search history.

(56) References Cited

U.S. PATENT DOCUMENTS 4,410,806 A * 10/1983 Brulle .......................... 290/44

(Continued)

FOREIGN PATENT DOCUMENTS

DE    197 39 162 A1    3/1999

(Continued)

OTHER PUBLICATIONS

International Search Report directed to counterpart International application No. PCT/EP2005/011352.

(Continued)

*Primary Examiner*—Nicholas Ponomarenko
(74) *Attorney, Agent, or Firm*—Morrison & Foerster LLP

(57) ABSTRACT

The invention relates to a wind turbine comprising a machine housing (12) equipped with a rotor (14), which is mounted to pivot on a sub-structure (10). Wind parameters and an electromechanical quantity are determined by means of measuring devices (21, 22, 23). To enable the machine housing (12) to track the wind, the wind turbine is equipped with a pivoting device (11) comprising a controller (8). The wind turbine is also equipped with a calibration module (2), which is configured to determine an effective mass of the electromechanical quantity using the wind speed. In addition, the turbine comprises an evaluation device (4) comprising a classifier (40), which is used to form a first average value for a first class, for which the wind direction is positive and a second average value for a second class, for which the wind direction is negative. A difference is determined by means of a comparator and a calibration signal is emitted to the controller (8) of the pivoting device (11). The invention permits an autonomous calibration of the controller (8) for the tracking of the machine housing (12) and thus reduces the risk of an erroneous positioning of the rotor (14) in relation to the wind direction, irrespective of the prevailing wind conditions. The invention is particularly stable in relation to variable wind forces and directions, especially in the presence of gusts.

18 Claims, 3 Drawing Sheets

U.S. PATENT DOCUMENTS

| | | | |
|---|---|---|---|
| 4,695,736 A | 9/1987 | Doman et al. | |
| 7,456,510 B2* | 11/2008 | Ito et al. | 290/44 |
| 2003/0127862 A1 | 7/2003 | Weitkamp | |
| 2004/0197186 A1 | 10/2004 | Wobben | |
| 2008/0290664 A1* | 11/2008 | Kruger | 290/55 |

FOREIGN PATENT DOCUMENTS

| | | |
|---|---|---|
| DE | 198 32 207 A1 | 1/2000 |
| DE | 199 34 415 A1 | 2/2001 |
| EP | 0 083 819 A1 | 7/1983 |
| GB | 2 398 841 | 9/2004 |
| WO | WO 2006/045556 | 5/2006 |

OTHER PUBLICATIONS

International Preliminary Report on Patentability, directed to counterpart International application No. PCT/EP2005/011352.

Farret et al., (2001) "Sensorless Active Yaw Control for Wind Turbines", *The 27th Annual Conferences of the IEEE Industrial Electronics Society*:pp. 1370-1375.

* cited by examiner

WIND TURBINE AND METHOD FOR THE AUTOMATIC CORRECTION OF WIND VANE SETTINGS

REFERENCE TO RELATED APPLICATIONS

This application is a national stage application under 35 USC 371 of International Application No. PCT/EP2005/011352, filed Oct. 21, 2005, which claims the priority of German Application No. 10 2004 051 843.2, filed Oct. 25, 2004, the contents of both of which prior applications are incorporated herein by reference.

FIELD OF THE INVENTION

The invention relates to a wind energy installation having a pylon, having a machine housing which is arranged on the pylon and whose azimuth position can be adjusted by means of a pivoting device, to a rotor which is arranged on one end face of the machine housing, such that it can rotate and drives a generator for production of electrical power, and to a controller for the pivoting device, to which measurement devices are connected in order to measure wind parameters and an electromechanical quantity.

BACKGROUND OF THE INVENTION

Modern wind energy installations are provided with rotors which have to be aligned with respect to the wind. Depending on the design of the rotor, it must be aligned such that it points into the wind (windward rotor) or away from the wind (leeward rotor), when seen along the rotor axis. In order to allow the rotor to be rotated to a correct azimuth position relative to the wind at any given time, a follow-up regulator with a weathervane is normally provided on the wind energy installation. This determines the direction of the incident wind and interacts with a pivoting device such that the rotor is pivoted to the correct azimuth position. The weathervane is generally mounted on a machine housing, at a point behind the rotor. It is therefore located in an area affected by vortices caused by the rotor. This results in measurement errors.

It is known from evident prior use for the discrepancies resulting from the arrangement of the weathervane behind the rotor to be determined and to be taken into account as a correction value. A calibration process must be carried out for this purpose during commissioning. One disadvantage of this method is that the calibration value determined in this way is applicable to only one rotor blade type and, strictly speaking, also to only one wind strength, at which the calibration was carried out. Furthermore, a further disadvantage is that the accuracy which can be achieved is not particularly good, even when using high-quality laser measurement methods. Normally, an accuracy of only 2° can be achieved. An accuracy such as this may appear to be acceptable since the efficiency of the wind energy installation varies only with the cosine of the position error. Discrepancies of up to 5° have been considered to be tolerable, against this background. However, it has been recognized that this approach has been adopted too readily, because further errors occur as well, because of unavoidable position errors with respect to the wind. Further causes of position errors include, in particular, the following:

Frequent or rapid changes in the wind direction, since the pivoting device cannot follow the wind without any deviation. Otherwise, this would easily result in overloading and premature failure of the mechanism. A further reason is the distortion of the air flow in the area of the weathervane, caused by the rotating rotor. This distortion is dependent on the wind strength and the wind direction and in general can be predicted only with difficulty. Inaccuracies also result from possible influences between adjacent wind energy installations. These are particularly pronounced when the wind energy installations are arranged in a line along the wind direction. All of these factors lead to a deterministic or stochastic position error of the weathervane. The errors that result from this cannot be compensated for completely by a simple, follow-up regulator for azimuth positioning. The position error results in detectable adverse effects, overall.

In order to counteract these adverse effects, optimization strategies have been developed. It is known from DE-A-199 34 415 for an improvement in simple follow-up control to be achieved by predetermining a plurality of power curves as a function of the wind speeds for power emission for various positions of the rotor with respect to the wind. These power curves are used to determine an optimum for calibration of the follow-up control, by means of optimization calculations that are known per se. The power curves must be determined and stored for various incidence angles during commission of the installation; it is also possible to adaptively vary the power curves during operation. One disadvantage of this technique is that the measurement of different power curves for different incidence conditions is complex.

SUMMARY OF THE INVENTION

The invention is based on the object, against the background of the prior art as cited above, of providing a wind energy installation and a method for alignment of the wind energy installation, which allows more accurate alignment, even in difficult conditions, with little complexity.

The solution according to the invention can be found in the features of the invention as disclosed broadly herein. Advantageous developments are the subject matter of the specific embodiments disclosed below.

According to the invention, in the case of a wind energy installation having a pylon, having a machine housing which is arranged on the pylon and whose azimuth position can be adjusted by means of a pivoting device, having a rotor which is arranged such that it can rotate on an end face of the machine housing, and drives a generator for production of electrical power, having measurement devices for measurement of the wind speed and direction and for an electromechanical quantity, and having a controller for the pivoting device, provision is made for a calibration module for the controller which comprises an efficiency measure element and an evaluation device, with the efficiency measure element being designed to calculate an efficiency measure for the production of the electromechanical quantity via the wind speed, and with the evaluation device having a classifier with a first output for a first class with a positive wind direction, and a second output for a second class with a negative wind direction, to which a first calculation element for determination of a first mean value of the first class and a second calculation element for determination of a second mean value of the second class are connected, and having a comparator element which is designed to determine the difference between the mean values of the first and second classes and to output a calibration signal corresponding to the difference to the controller for the pivoting device.

The invention therefore achieves a reduction in the position error of the rotor with respect to the wind direction, to be precise irrespective of the instantaneous wind conditions. The essence of the invention is the idea of providing a separate calibration module, which acts on the controller for the pivoting device. The calibration module is used to check whether the machine housing has actually been aligned correctly into the wind by the controller. If this is not the case, then a correction value is output to the controller, on the basis of which the controller further aligns the machine housing. Errors such as those which occur as a result of inaccurate installation of the weathervane (steady-state errors) are compensated for in this way. However, other types of position error can also be compensated for, for example those caused by poor incidence flow conditions on the weathervane (dynamic errors), such as those which can occur by deflection of the airflow in the lee of the rotor (corkscrew effect). Furthermore the invention makes it possible to achieve optimum alignment of the rotor even when the wind conditions are not homogeneous over the entire rotor area. Even a weathervane which can measure as accurately as this cannot on its own achieve optimum rotor alignment. Thanks to the calibration module according to the invention, which takes account of the conditions which are actually acting on the rotor, optimum alignment is made possible even in conditions that are as severe as this.

One major aspect is based on the use of a specialized element to form an efficiency measure. The efficiency measure is an indicator of the magnitude of the actual output of the wind energy installation in the given wind conditions, that is to say how well it makes use of the wind. The efficiency measure results in the controller being independent of influences which are caused by changes in the wind speed. Various physical variables may be used as a quantity for the efficiency measure. This will frequently be the electrical power. However, it is also possible to use the electrical energy that is generated. This has the advantage that, when a measurement is carried out over a specific time period, brief fluctuations are compensated for automatically by the integration associated with this. However, other variables can also be used, such as the electrical torque of the generator or the mechanical torque passed from the rotor to the generator, or to an intermediate transmission. The efficiency measure element is preferably in the form of a normalization element, which is designed to normalize the quantity with respect to the wind speed. This is expediently done in the simplest form by forming the ratio of the electrical power to the third power of the wind speed. This makes it possible to eliminate the influence of varying wind speeds. The invention can even take account of those errors which occur as a result of wind direction shifts resulting from a freshening wind. The quality of the azimuth position is therefore considerably improved.

A relevance filter is preferably provided. This is designed to ignore values outside adjustable limit values or to take account of them only to a lesser extent. For example, it rejects data records below a minimum power and/or above a maximum speed. This makes it possible in particular, to constrain the operating range of the calibration module according to the invention to the range of so-called optimum tip-speed ratio. The optimum tip-speed ratio range relates to the wind speeds at which the rotation speed of the rotor is chosen to be proportional to the wind speed. The tip-speed ratio is the ratio of the blade tip speed to the wind speed. The relevance filter makes it possible to ignore operation away from the optimum tip-speed ratio. Furthermore, the relevance filter can be used to ignore influences caused by extraordinary circumstances, which could otherwise lead to distortion of the measurement result.

The efficiency measure element preferably additionally has a system model of the rotor/generator system. The system model includes system knowledge relating to the mechanical and electrical behaviour of the rotor/generator system for conversion of mechanical energy to electrical energy, in the form of a mathematical model. In this case, particular account is also taken of influencing variables such as inertia of the rotor/generator system. A model such as this can be used to improve the quality of the efficiency measure that is formed since even a rotor rotation speed which varies only slowly under the influence of gusts can be recorded appropriately. The model can intrinsically be designed as required. However, it has been found to be advantageous for it to be in the form of a first-order delay element. This allows the system behaviour to be approximated well with comparatively little effort. It is also possible to provide for the system model to map the system behaviour, in terms of different efficiency levels of the wind energy installation. By way of example, the efficiency levels differ in different operating ranges of the wind energy installation. The efficiency level in the region of the optimum tip-speed ratio is higher than in the upper constant rotation speed control range, and is also, once again, different from the efficiency level in the lower power range. A system model configuration such as this makes it possible to refine the mapping of the system behaviour.

The calculation element is preferably designed to calculate a weighted mean value. The expression a weighted mean value means a mean value for which the individual summands are weighted with different factors and are included in the calculation. Various factors may, for example, be in the time domain for a window function. Expedient window forms are, for example, a rectangular window or a Hamming window. Different window forms may also be used.

The efficiency measure element is preferably designed to be self-adapting. This makes it possible for it to autonomously match itself to varying location-dependent or wind-condition-dependent factors. This is particularly advantageous when distortion occurs in the case of winds from one specific direction, leading to incorrect measurements of the wind direction via the weathervane, or for which the wind is not homogeneous, when seen over the rotor area. Furthermore, a correction module is expediently provided. This allows adaptation of the wind energy installation overall, or matching different components on it. For example, a wind energy installation may be equipped with different rotor blades, whose blade depths differ. This is also in turn dependent on how severely the rotor blades corrupt the wind measurement via the weathervane on the machine housing. Corresponding correction values can be stored in a module such as this in order to call them up as required as a function of the actual equipment fit of the wind energy installations.

It is expedient to provide a memory in which the measured wind speed, wind direction and measures of the electromechanical quantity are stored. For this purpose, it is designed to store the measured data items individually or in a combined form, for example as a mean value over a specific time period. The memory is connected to the efficiency measure element and to the calculation elements. The memory is preferably in the form of a ring buffer, which can store a predeterminable number of data records. This means that the same number of data records from the past are always available, with excessively old data records automatically being overwritten by new data records.

The evaluation device preferably has a threshold value switch. In the event of discrepancies of less than a specific limit value, for example of 1%, no correction value is emitted. If the discrepancy becomes greater, then a correction value for the azimuth position of 1° is emitted for every 1% of discrepancy. The relationship between the magnitude of the discrepancy and the magnitude of the correction value is preferably stored in a characteristic element.

The measurement device can be designed such that it determines the wind direction in an absolute or relative form. In this case, absolute is understood as being a value related to an Earth-fixed coordinate system (for example clockwise, based on north). Relative means a coordinate system which is related to the azimuth position of the machine housing, with the reference line in this case being the rotor axis. The measurement device is preferably arranged on the machine housing. This has the advantage of a compact and simple arrangement in the vicinity of the corresponding rotor. However, it is quite possible for the measurement device to be arranged separately, for example on a separately installed measurement tower. This variant is particularly appropriate when a plurality of wind energy installations have to be supplied with data from the same measurement device. An indirect wind measurement can also be provided instead of a direct wind measurement as described above. For example, the measurement devices can be designed to record tower bending or rotor-blade bending torques. The latter offers the advantage that it allows a relative measurement, in contrast to the measurement methods mentioned above, which measure the wind strength in an absolute form (using Beaufort, meters per second, knots, etc.). Relative means that the rotor blade bending torques increase particularly markedly when the machine housing is not aligned correctly with the wind. This applies in particular to periodic changes in the rotor-blade bending torques.

The invention also relates to a method for alignment of wind energy installations which have a machine housing, which is arranged on a pylon such that it can pivot and has a rotor on its end face, having the steps of measurement of the wind speed, wind direction and a measure for an electromechanical quantity, formation of an efficiency measure for the electromechanical quantity via the wind speed, classification on the basis of positive and negative wind direction and formation of a first mean value from the efficiency measures for which the wind direction is positive, and formation of a second mean value from the efficiency measures for which the wind direction is negative, determination of the difference between the first and second mean values and outputting of a calibration value corresponding to the difference to the controller in order to pivot the machine housing.

Reference is made to the above statements for explanatory purposes.

A number of the expressions used will also be explained in the following text.

A data record is a group of parameters recorded at a specific time, comprising at least the wind speed, the wind direction and the electrical power output.

The term mean value should be understood widely in the mathematical sense. It covers not only the arithmetic mean but also other types of weighted mean values or else other calculation forms, such as the geometric mean. It is self-evident that the invention is not restricted to determination of one and only one mean value for a positive or negative wind direction. It is equally possible to provide for two or more mean values to be calculated in each case. In addition, it is also possible to provide for a neutral range to be formed, that is to say a wind direction which is neutral, or is positive or negative only by a variable small amount.

A positive wind direction is a wind direction which is located on the right when seen along the rotor axis from the machine housing to the rotor. A negative wind direction is, correspondingly, that on the left of the rotor axis from the machine housing to the rotor.

Azimuth means the orientation of the machine housing with its rotor axis on the horizontal plane. The movement of the machine housing to different azimuth positions is referred to as pivoting.

A pivoting device is an apparatus which is designed to vary the azimuth position of the machine housing. It is generally in the form of an active control drive with a reversible drive motor. However, it is also possible for it to be in a passive form, with a blocking device; the machine housing is aligned by the force of the wind and is kept in the correct azimuth position by means of the blocking device (brake). This embodiment is particularly expedient for leeward rotors.

BRIEF DESCRIPTION OF THE DRAWINGS

The invention will be explained in the following text with reference to the drawing, which illustrates one advantageous exemplary embodiment of the invention, and in which.

DETAILED DESCRIPTION OF THE INVENTION

Figure 1:
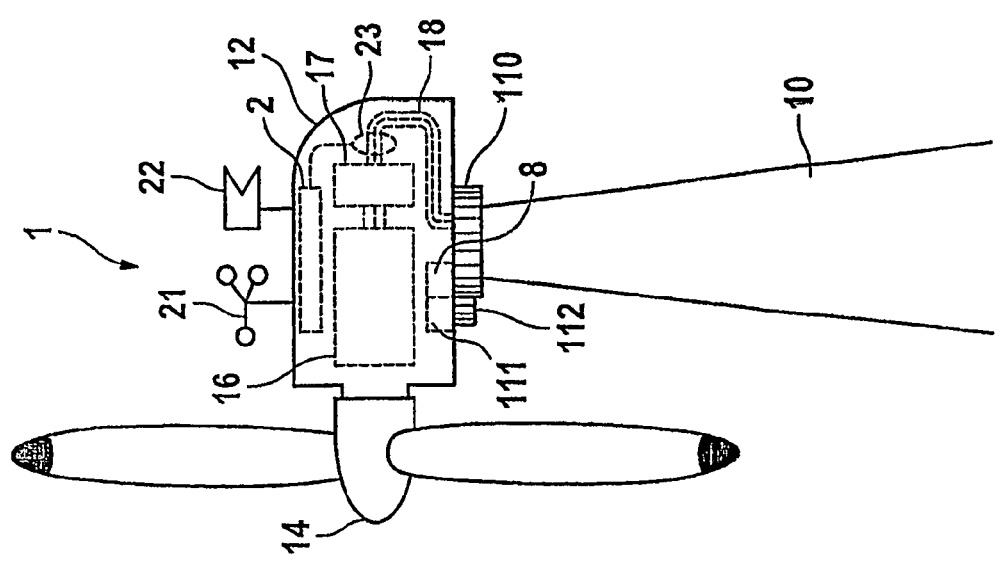
FIG. 1 shows a schematic view of one exemplary embodiment of a wind energy installation according to the invention.

FIG. 1 shows a wind energy installation according to one exemplary embodiment of the invention, which has a tower as the pylon 10 at whose tip a machine housing 12 is arranged such that it can pivot. A rotor 14 with a plurality of blades is arranged such that it can rotate on one end face of the machine housing 12. This acts by means of a shaft, which is not illustrated, on a generator 16 in order to produce electrical power. Furthermore, a converter 17 and lines 18 are provided in order to pass the electrical power into the tower 10, and from there to the loads. Furthermore, a controller 8 for azimuth adjustment of the machine housing 12 is arranged in the machine housing 12. Sensors 21, 22 for wind parameters (wind strength and wind direction) as well as an electrical power measurement device 23 and a pivoting device 11, as an actuator, interact with this controller 8.

The mechanical design for azimuth adjustment will be explained first of all. A large circumferential toothed ring 110 is arranged at the upper end of the tower 10. A pinion 112 engages in its external tooth system and is arranged on the lower face of the machine housing 12. The pinion 112 is driven by a drive motor 111 for the pivoting device 11. The drive motor 111 is operated by the controller 8. The method of operation is as follows, when the controller 8 produces a signal for azimuth adjustment, then the drive motor 111 for the pivoting device 11 is driven. This causes the toothed wheel 112 to rotate and this runs in the circumferential tooth system of the stationary toothed ring 110. This results in the machine housing 12, with the rotor 14, being pivoted on a horizontal plane with respect to the tower 10. The rotation direction of the drive motor 111 is in this case chosen depending on the desired pivoting direction of the machine housing 12.

The controller 8 is designed to autonomously determine output signals for the pivoting device 11 from measured wind parameters. The sensors 21 and 22 are provided for measurement of the wind parameters. The sensor 21 is in the form of a cup-type anemometer, which is known per se, and is used to determine the wind strength. The sensor 22 is in the form of a weathervane which is known per se and is used to determine the wind direction. The sensors 21, 22 are connected to the controller 8 via an analog/digital converter 24, in a manner which will be explained in more detail later. The controller 8 is in the form of a follow-up regulator and acts on the pivoting device 11 such that the machine housing 12 is aligned in the wind direction.

Furthermore, according to the invention, a calibration module 2 is provided. Before explaining this in more detail, the measurement devices for the wind parameters will be explained again. The two sensors 21, 22 are arranged at the top on the machine housing 12. Thus, as seen in the wind direction, they are located behind the rotor 14 assuming that, as normal, the rotor 14 is a windward rotor. In the case of a leeward rotor, they would be arranged in front of the rotor. In both cases, the air flow in the region of the sensors 21, 22 is influenced by the rotary movement of the blades of the rotor 14. Other frequent error sources are installation inaccuracies as well as influences caused by external factors, for example by an adjacent wind energy installation in a wind park, which can likewise lead to vortices and flow changes. In order to align the machine housing 12 and rotor 14 as accurately as possible with respect to the wind despite the disadvantageous influences resulting from this, the calibration module 2 is, according to the invention, designed as will be described in the following text in more detail with reference to FIG. 4. It should be noted that the calibration module 8 need not be in the form of a physically separate unit, and can also be integrated in the controller 2.

Figure 4:
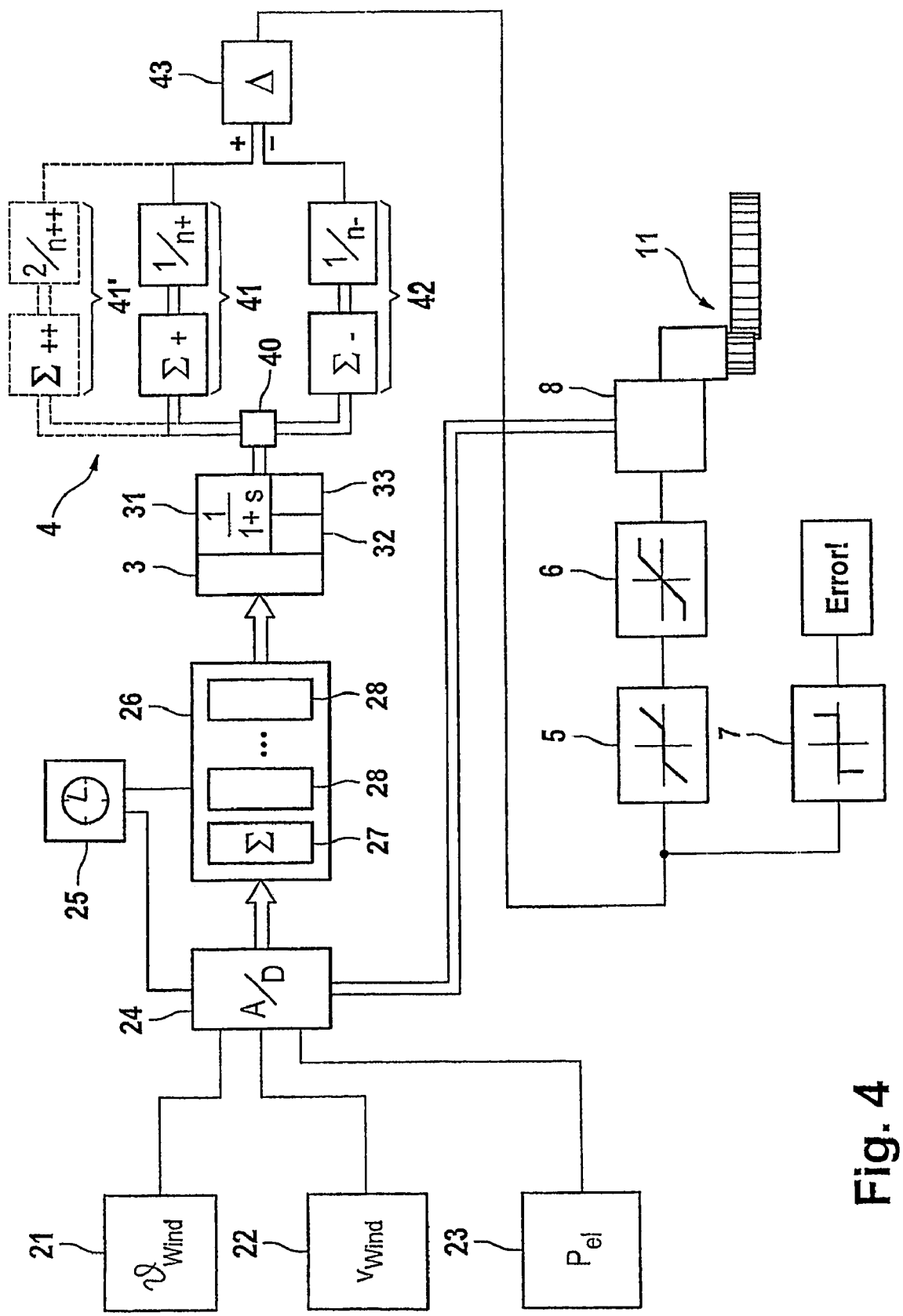
FIG. 4 shows a schematic view of a block diagram of the exemplary embodiment illustrated in FIG. 1.

FIG. 4 shows a schematic block diagram of the controller 8 and of the calibration module 2 according to the invention. In the left-hand area of the figure, the sensors 21, 22 can be seen as measurement devices for wind parameters (wind direction $\vartheta$ and wind speed v), as well as a sensor 23 for the electrical output power ($P_{el}$). The measured electrical power is preferably the real power P since it is better to use this as a measure for the power that actually has to be generated by the wind energy installation 1 than to use the volt-amperes or the Wattless component, and is therefore more suitable for use as an efficiency measure. However, it is also possible to provide for the electrical energy output to be used instead of the power. This has the advantage that it results in automatic integration when measurements are carried out over a relatively long time period. The meters which are provided in a wind energy installation in any case for the emitted energy (kilowatt hours meters) can expediently be used for this purpose. This not only saves a separate sensor but also results in the power signal being integrated automatically, thus reducing undesirable noise in the measurement signal. Other parameters can also be used which are a measure of the work or power generated by the rotor/generator system. In this case, it is possible in particular to make use of the mechanical torque emitted from the rotor or the electrical torque produced by the generator, which is used with or without rotation-speed assessment, depending on the operating range.

The signals supplied by the sensors 21, 22, 23 are sampled by an analog/digital converter 24 at specific times. The sampling times are governed by a timer 25, which is connected to the A/D converter 24 and to an optional memory 26. The digital data, as produced by the A/D converter 24, from the sensors 21, 22, 23 can be stored as a data record 28 in the memory 26 after optional preprocessing in an adder 27. The memory 26 is in the form of a ring buffer which stores a specific number of data records and correspondingly deletes relatively older data records when new data records are added. In the illustrated exemplary embodiment, the memory 26 is of such a size that it contains one hundred data records 28. By way of example, these each cover an interval of ten minutes. It has been found that an interval of ten minutes gives good measured-value quality. This time period is less than that of weather changes, for example, as a result of the movement or variation of high-pressure or low-pressure regions. On the other hand, however, the time period is greater than that of more rapid, dynamic weather influences, such as gusts, thermal bubbles or microbursts. According to the invention, sampling at an interval of about ten minutes is optimal in the sense that this minimizes undesirable influences resulting from rapid dynamic changes, as well as those resulting from long-term changes.

The A/D converter 24 and the memory 26 do not necessarily need to be provided. The required wind parameters, as well as the measure for the electromechanical quantity are frequently available in any case from the operating control system of the wind energy installation, to be precise in many cases already in the form of a mean value over ten minutes. Separate measurement and storage are then superfluous. The parameters can be processed further directly, as will be described in more detail in the following text.

An efficiency measure element 3 and an evaluation device 4 are provided for further processing. The efficiency measure element 3 can be arranged with respect to the optional memory 26 such that, as illustrated in FIG. 4, it does not process the data records 28 until they are read; however, it is also possible for the efficiency measure element 3 to process the data records 28 before they are stored in the memory 26. In the illustrated exemplary embodiment, the efficiency measure element 3 is in the form of a normalization element. For this purpose, it is designed to divide the measured electrical power $P_{el}$ by the third power of the wind speed v. The calculation results in a coefficient for the efficiency of the wind energy installation 1 in the given azimuth position and with the given wind conditions. If the optional memory 26 is not provided, the efficiency measure element is expediently designed to process the electrical energy emitted in a specific time period from the wind energy installation, rather than the electrical power $P_{el}$. As has already been described above, this allows a particularly economic embodiment. Furthermore, a system model 31 is optionally provided. This represents a mathematical approximation of the rotor/generator system 14, 16 and its behavior in various wind conditions. This makes it possible, in particular, to take account of the influence of abruptly changing wind strength, such as the onset of wind gusts, and rotation speed changes resulting from them. This is a major advantage, in particular in the case of installations whose rotation speed is variable, in which the mass inertia of the rotor/generator system 14, 16 is used for short-term storage of the energy of wind gusts. Furthermore, a relevance filter 32 is provided. This is designed to reject values outside variable limits for the wind speed or electrical power. In the illustrated exemplary embodiment, the relevance filter 32 is set such that data records with wind speeds of more than 10 m/s or with an electrical power of less than 40 kW (with respect to an installation rating of 1500 kW) are rejected. The limit values are expediently chosen such that the only values which are still processed are those for medium wind conditions. In other words, the only values which are processed further are those for which the wind energy installation 1 is being operated in the so-called $\lambda_{opt}$ mode, that is to say the rotation speed of the rotor 14 is set such that there is a specific ratio between the blade tip speed and the wind speed.

In principle, the invention can also be used in other fields, although the normalization function of the efficiency measure element 3 and the system model 31 may then need to be adapted or extended. A correction element 33 is expediently and additionally provided for this purpose, containing details about the system behavior away from the $\lambda_{opt}$ range. Furthermore, it may contain details about various variants of wind energy installations in which the apparatus according to the invention is provided. These details cover major parameters which are important for operation of the rotor/generator system. One example of this is the type of rotor blade used. It is known that thin or deep rotor blades produce a different amount of swirl in the lee, thus inducing different weathervane deflections. Provision is preferably made for a plurality of sets of parameters to be stored in the correction element for various types of wind energy installations, different types of rotor blades, etc. from which a suitable set can be selected. The correction element 33 can also preferably be provided with an adaptation algorithm. The adaptation algorithm is used to match the parameter, or variables which are used in the other components of the efficiency measure element, to changing conditions, for example, in the system model 31. This can be done by determining and compensating for factors which are dependent on the wind direction and/or are specific to the location and/or dependent on the respective location of the wind energy installation by comparison with external measurement devices, for example the wind mast 10'. If, by way of example, a wind energy installation is arranged such that flow is instant on it obliquely from natural or artificial structures when the wind is in a specific direction, then the adaptation algorithm can be used to compensate for the corresponding direction discrepancy. This is particularly applicable in situations in which there are a plurality of wind energy installations arranged in a wind park, and mutual shadow effects occur with specific wind directions. Since the influences that result from this can frequently not be calculated sufficiently accurately in advance, a self-adapting algorithm has the advantage that it autonomously matches itself to the respective conditions. This is particularly true even in those situations, which can in general be calculated in advance only with difficulty if at all, in which the wind speed or wind direction is or are not distributed homogeneously over the rotor area. This is a phenomenon which can be observed quite frequently, particularly in the case of modern, large wind energy installations with rotor diameters of more than one hundred meters.

This is then followed by an evaluation device 4, which has essentially two channels with a classifier 40 at each input. The classifier 40 is designed to then classify whether the data being applied to its input is the positive or negative wind direction, and to pass it on as appropriate to the first or second output, respectively. A first channel is connected to the first output and a second channel is connected to the second output. The first channel has a first calculation element 41 for determination of a first mean value from the data records 28 for which the wind direction is positive. In this case, positive means that the direction of the wind is from the right, seen with respect to the rotor axis of the machine housing 12. The first calculation element 41 adds the efficiency coefficients formed by the efficiency measure element 3 and divides the sum that results in this case by the number of coefficients added up. The second calculation element 42 is designed in a corresponding manner to this to form a second mean value from the data records for which the wind direction is negative. The first and second mean values which result from this are supplied to the comparator 43. The comparator 43 calculates the difference between the two values. In addition, more than two channels may be provided. For example, one additional channel may in each case also be provided for large positive discrepancies (symbol ++) as represented by 41' in FIG. 4; a channel for large negative discrepancies can be provided in a corresponding manner symmetrically on the negative side (not illustrated). Furthermore it is possible to provide a neutral channel (not illustrated) between the first channel and the second channel. This is designed to process values for which the wind direction is neither positive nor negative (possibly with a variable tolerance band). The comparator 43 can calculate the difference value continuously, although it is preferably designed such that it does this at regular time intervals, or when the calculation elements 41, 42 have processed a specific number of values (for example 100). The difference value is applied to a threshold value switch 5. If the difference between the two mean values is less than 1%, then the azimuth position is correct, and there is no need to do anything. If the discrepancy is greater than 1%, then the value is applied to a characteristic element 6. This uses the value of the discrepancy to determine a new calibration value for the controller 8 on the basis of a stored characteristic. This new calibration value is applied to the controller 8, and acts on the pivoting device 11 such that the azimuth position of the machine housing 12 is appropriately readjusted. In the illustrated exemplary embodiment, the characteristic element 6 is designed such that it produces a change of 1° for each 1% of discrepancy in the calibration value. This completes the adjustment process, and the cycle starts again with the old values being deleted by new ones.

In addition, an error module 7 is also provided, to whose input the difference signal, as determined by the comparator 43 is applied. The error module 7 is likewise in the form of a threshold value switch. If the difference signal is more than 10% then an error message is emitted, and the correction of the azimuth position may be disconnected.

Figure 3:
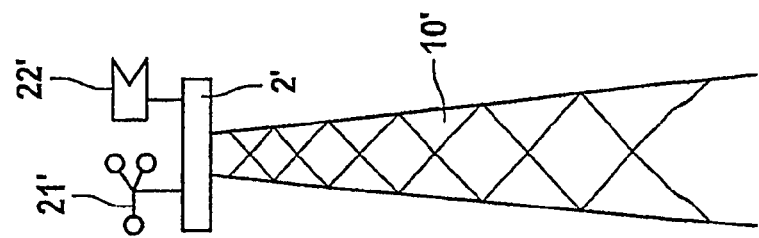
FIG. 3 shows a schematic view of a separate controller with a measurement device according to a second exemplary embodiment.
Figure 2:
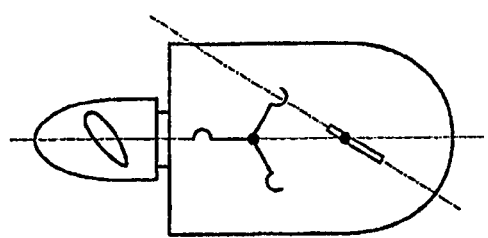
FIG. 2 shows a plan view of the wind energy installation illustrated in FIG. 1.

FIG. 3 illustrates a further embodiment, which differs from the embodiment shown in FIG. 1 in that the controller 8' is arranged, together with its sensors 21', 22', for the wind speed and the wind direction, on a separate tower 10' rather than on the machine housing of the wind energy installation 1. An arrangement such as this may be advantageous when the controller 8' is acting on a plurality of wind energy installations. An embodiment such as this may be particularly worthwhile when a plurality of wind energy installations are installed at one location at which the wind conditions are relatively uniform, for example, in a flat coastal region.

Figure 5:
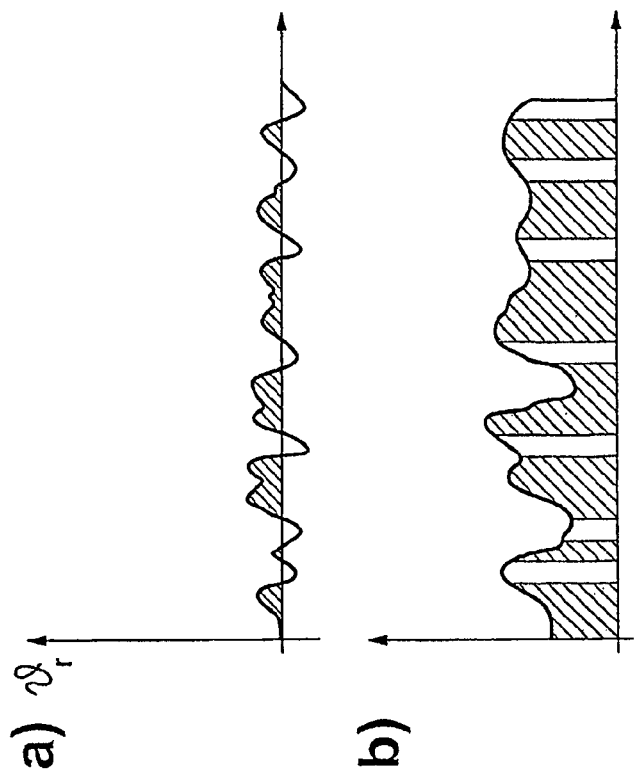
FIG. 5 shows profiles for parameters of the data record.
Figure 6:
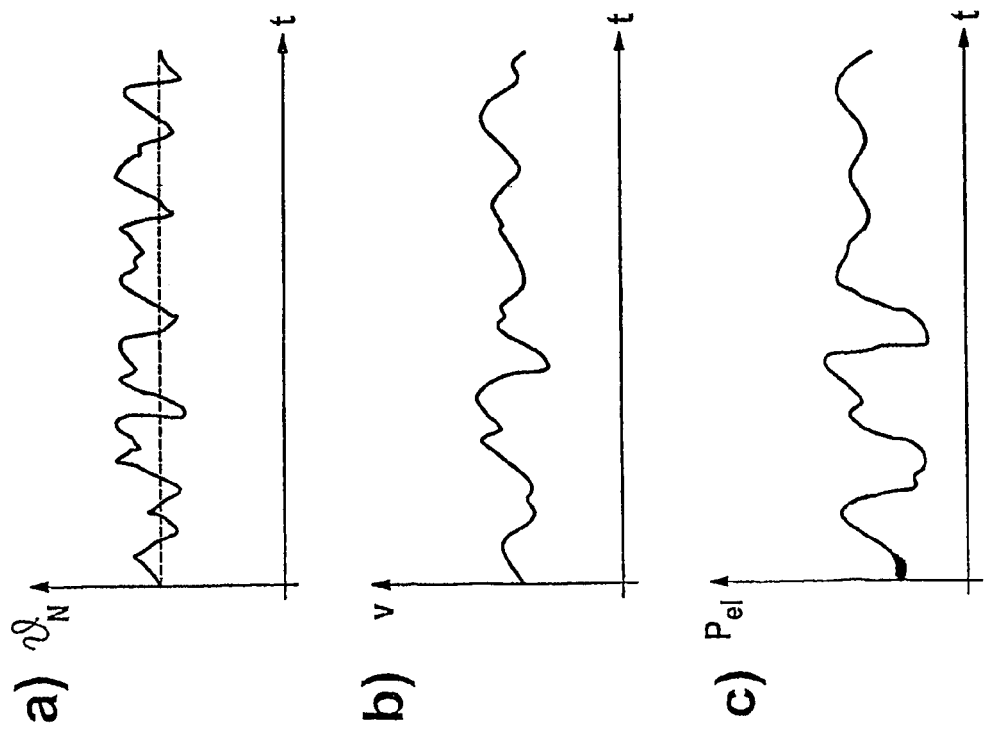
FIG. 6 shows curves calculated by the evaluation device.

The way in which the method operates is illustrated in FIGS. 5 and 6. FIG. 5a shows the wind direction $\vartheta$ with respect to the northerly direction, plotted against the time. The figure also shows, as a dashed line, the position of the machine housing 12 with respect to the northerly direction. FIG. 5b shows the measured wind speed v on the same scale plotted against the time t. Finally, FIG. 5c shows the electrical power output $P_{el}$, likewise plotted using the same time scale. These parameters are sampled by the A/D converter 24 and the data records 28 resulting from the samples are stored in the memory 26. The curves illustrated in FIG. 6 are then obtained during the subsequent evaluation. FIG. 6a shows the wind direction $\vartheta_r$ with respect to the position of the machine housing 12. Those areas in which the wind direction is positive have positive shading. FIG. 6b shows the efficiency coefficient, calculated by the efficiency measure element 3. Once again, all those areas in which the wind direction is positive are shaded. The first and second calculation elements 41, 42 now add up the values of all of the areas and use this to form a possibly weighted mean value, for which the wind direction is positive (shaded) or negative (not shaded). It should be noted that the averaging process can also be carried out continuously, so that a memory 26 is not absolutely essential. As can be seen from the illustration in FIG. 6*b* itself, the shaded components predominate. This means that the mean value of the positive wind direction is greater than that of the negative wind direction, thus resulting in a corresponding difference value. This also means that the machine housing 12 must be rotated in the direction of the positive wind direction in order to reposition optimally with respect to the wind. The controller 8 accordingly applies a calibration value via the threshold value switch 5 and the characteristic element 6. This then drives the pivoting device 11.

The invention claimed is:

1. A wind energy installation, comprising:
    a pylon,
    a machine housing arranged on the pylon and having an azimuth position that can be adjusted by means of a pivoting device,
    a rotor configured to rotate on an end face of the machine housing and to drive a generator for production of electrical power,
    measurement devices for measurement of wind speed and direction and of an electromechanical quantity,
    a controller for the pivoting device, and
    a calibration module for the controller that comprises an efficiency measure element configured to calculate an efficiency measure for the production of the electromechanical quantity via the wind speed and an evaluation device,
    the evaluation device comprising a classifier with a first output for a first class with a positive wind direction, and a second output for a second class with a negative wind direction, to which a first calculation element for determination of a first mean value of the first class and a second calculation element for determination of a second mean value of the second class are connected, and a comparator element which is designed to determine the difference between the mean values of the first and second classes and to output a calibration signal corresponding to the difference to the controller for the pivoting device.

2. The wind energy installation of claim 1, wherein the quantity is electrical energy.

3. The wind energy installation of claim 1, wherein the quantity is the electrical power.

4. The wind energy installation of claim 1, wherein the quantity is the mechanical or electrical torque.

5. The wind energy installation of claim 1, wherein the efficiency measure element is a normalization element configured to normalize the quantity with respect to the wind speed.

6. The wind energy installation as claimed in claim 5, wherein the normalization element comprises a potentiation module which calculates a third power of the wind speed.

7. The wind energy installation of claim 1, wherein the efficiency measure element includes a system model of the rotor/generator system.

8. The wind energy installation of claim 5, wherein the efficiency measure element includes a system model of the rotor/generator system.

9. The wind energy installation of claim 7, wherein the system model comprises a first-order delay element.

10. The wind energy installation of claim 1, wherein the calculation elements are configured to calculate a weighted mean value.

11. The wind energy installation of claim 1, further comprising a memory in which data records are stored with the measured wind speed, wind direction and the measure of the electromechanical quantity, and wherein the efficiency measure element is configured to call up data records.

12. The wind energy installation of claim 11, wherein the memory is in the form of a ring buffer in a predeterminable number of memory data records.

13. The wind energy installation of claim 1, wherein at least one further class is provided for positive or negative wind direction and/or a neutral class is provided for a mid wind direction.

14. The wind energy installation of claim 1, wherein the efficiency measure element is designed to be self-adapting.

15. The wind energy installation of claim 1, further comprising a correction module for matching different wind energy installations or components of said different wind energy installations.

16. The wind energy installation of claim 1, wherein the measurement device for the wind parameters is provided separately from the wind energy installation.

17. The wind energy installation of claim 1, further comprising a relevance filter configured to ignore values outside adjustable limit values or to take account of them only to a smaller extent.

18. A method for alignment of a plurality of wind energy installations each comprising a machine housing arranged on a pylon such that the machine housing can pivot and has a rotor on an end face, comprising:
    measuring wind speed, wind direction and a measure for an electromechanical quantity;
    forming an efficiency measure for the quantity via the wind speed;
    classifying on the basis of positive and negative wind direction and formation of a first mean value from the efficiency measures for which the wind direction is positive;
    forming a second mean value from the efficiency measures for which the wind direction is negative;
    determining a difference between the first and second mean values; and
    outputting a calibration value corresponding to the difference to a controller in order to control pivoting of the machine housing.

* * * * *

UNITED STATES PATENT AND TRADEMARK OFFICE
CERTIFICATE OF CORRECTION

| | | |
|---|---|---|
| PATENT NO. | : 7,550,862 B2 | |
| APPLICATION NO. | : 11/666214 | |
| DATED | : June 23, 2009 | |
| INVENTOR(S) | : Jens Altemark | |

It is certified that error appears in the above-identified patent and that said Letters Patent is hereby corrected as shown below:

On the Coverpage, in the (57) Abstract:

Please delete:

"The invention relates to a wind turbine comprising a machine housing (12) equipped with a rotor (14), which is mounted to pivot on a sub-structure (10). Wind parameters and an electromechanical quantity are determined by means of measuring devices (21, 22, 23). To enable the machine housing (12) to track the wind, the wind turbine is equipped with a pivoting device (11) comprising a controller (8). The wind turbine is also equipped with a calibration module (2), which is configured to determine an effective mass of the electromechanical quantity using the wind speed. In addition, the turbine comprises an evaluation device (4) comprising a classifier (40), which is used to form a first average value for a first class, for which the wind direction is positive and a second average value for a second class, for which the wind direction is negative. A difference is determined by means of a comparator and a calibration signal is emitted to the controller (8) of the pivoting device (11). The invention permits an autonomous calibration of the controller (8) for the tracking of the machine housing (12) and thus reduces the risk of an erroneous positioning of the rotor (14) in relation to the wind direction, irrespective of the prevailing wind conditions. The invention is particularly stable in relation to variable wind forces and directions, especially in the presence of gusts."

And replace with:

-- A wind energy installation includes a pylon, a pivotable machine housing arranged on the pylon, a rotor configured to rotate on an end face of the machine housing and to drive a generator for production of electrical power, measurement devices for measurement of wind speed and direction and of an electromechanical quantity, a controller for the pivoting device, and a calibration module for the controller that comprises an efficiency measure

UNITED STATES PATENT AND TRADEMARK OFFICE
CERTIFICATE OF CORRECTION

PATENT NO. : 7,550,862 B2
APPLICATION NO. : 11/666214
DATED : June 23, 2009
INVENTOR(S) : Jens Altemark It is certified that error appears in the above-identified patent and that said Letters Patent is hereby corrected as shown below:

element configured to calculate an efficiency measure for the production of the electromechanical quantity via the wind speed and an evaluation device. The evaluation device includes a classifier with outputs for positive and negative wind directions and calculation elements for determining mean values of the outputs and a comparator element which determines the difference between the mean values and outputs a calibration signal corresponding to the difference to the controller for the pivoting device. --

Signed and Sealed this

Twenty-fifth Day of August, 2009

David J. Kappos
*Director of the United States Patent and Trademark Office*